Feb. 20, 1934.　　A. J. TOWNSEND　　1,947,683
RAILWAY VEHICLE
Filed Aug. 2, 1930　　5 Sheets-Sheet 5

Fig. 6.

INVENTOR
Albert J. Townsend
BY
Lyme Tvedt & Lechner
ATTORNEYS

Patented Feb. 20, 1934

1,947,683

UNITED STATES PATENT OFFICE 1,947,683

RAILWAY VEHICLE

Albert J. Townsend, Lima, Ohio

Application August 2, 1930. Serial No. 472,644

69 Claims. (Cl. 105—82)

This invention relates to railway vehicles, and particularly to locomotive construction, both as a co-operative whole and as to certain elements thereof such as the running gear, supporting means and driving mechanism of the locomotive, and it is especially useful and advantageous in light industrial locomotives such as locomotives equipped with internal combustion engines and selective gear transmissions.

Among the primary objects of the invention are: to improve and simplify the running gear of such locomotives and the mounting and support of the superstructure on said running gear; to improve the riding and tracking qualities of locomotives of such character, particularly those of short wheel base; to provide a novel and improved axle box and equalizing system; and to provide new and useful driving mechanism, superior to such mechanisms heretofore in use, for carrying the power from the power plant to the wheels.

More specifically, the invention contemplates the provision of a rugged, although very flexible driving arrangement, between the engine and the wheels, particularly adapted for transmitting power from an engine located between the wheels to a point for connection to the outer ends of the axles, and further to combine such drive with the spring suspension, axle boxes, and equalizer system, in such manner as to permit free play of the axles and running gear as a whole, both with respect to each other and to the superstructure, while at the same time maintaining in proper alignment and operative position all the necessary working parts of the driving system; whereby the superstructure, running gear and driving mechanism are all co-ordinated to produce great structural and functional advantages.

In general, the invention involves a complete reorganization of the locomotive, and particularly of the supporting, driving and running gear thereof, in such a way as to produce a unified whole which is much smoother in operation, less likely to get out of adjustment or alignment; less subject to strains and breakage, much superior in operation in every way, and rugged and simple in character, so as to be readily constructed, inspected, assembled, disassembled, and repaired.

The invention further involves various details of construction, which will more fully hereinafter appear.

How the foregoing, together with such other objects as may occur to those skilled in the art are obtained by my invention will be evident from the following description, taken together with the accompanying drawings, in which drawings.

Referring to the drawings in general, it will be seen that I have illustrated a small gasoline—or oil-burning industrial or yard locomotive of a type which is particularly applicable to service involving shunting of cars, intermittent work, operation on crooked and rough trackage, and more or less rough service generally. The locomotive comprises a frame A, power-plant or engine B, housing or hood C therefor, and cab D.

The frame A, carrying at each end suitable couplers 2, is mounted on a pair of axles 3 having wheels 4, each of said axles being vertically movable with respect to the frame, as follows: On the left side of the locomotive (see Figs. 2 and 6) each axle, the rear one only being illustrated in Fig. 6, has a journal or extension 5, mounted in a box 6, on top of which a spring 7, secured at its ends by suitable brackets 7a (shown in Fig. 2) to the left side member 8 of the locomotive frame, bears, pedestal jaws or guides 8a placed at the sides of the opening or slot 9 permitting relative vertical movement or play between the frame and the said parts of the running gear, under flexure of the spring in the usual manner under variations of load, unevenness of track, etc. On the right side of the locomotive (see Figs. 1, 3, 4 and 5) each axle has a journal or extension 10 mounted, respectively, in one of the socketed or apertured end portions 11 of a combined floating equalizer beam and axle-box 12. In other words, the longitudinally-extending floating beam or lever 12 serves as a common axle-box for the two axles, the extension 10 of each of which is journalled in a sleeve or socket 11 near an end of said beam, which maintains a fixed spacing between the axles and equalizes the load on the same, said load being carried down from the right hand frame member 13, through spring 14, to the beam 12 intermediate its ends, the spring preferably being mounted on a seat 12b at the top of the beam and receiving the weight of the superstructure through the brackets and links 15 and 16.

The beam 12 is thus free both to float or move up and down under the usual spring flexure and also to rock about the spring saddle, as a fulcrum, under the vertical movements of the axle ends 10 relatively to the frame member 13, suitable slots or apertures 17 being provided in said frame member. The ends of beam 12 interlock, as by sockets 18, with lugs 19 on the frame, to permit relative vertical sliding movement therebetween but to restrain the beam as against lateral displacement.

The foregoing general construction, as well as the mounting of the drive-shaft 20 and associated parts on and with respect to the beam 12, is an important part of the present invention, both per se, because of the simple, rugged and flexible three-point suspension provided thereby, and also in its co-operative relation with the construction of the driving mechanism and other parts now to be described.

Said construction includes in general the provision or employment of a cross or jack-shaft 21, gearing 22, 23, between said shaft and shaft 20, pinions and gears 24, 25, at each end of shaft 20, flexible joints 26, 26 between gears 25 and wheels 4, and a flexible joint 27 between jack-shaft 21 and the driving shaft 28 extending from gear or transmission casing 29 which is coupled to the engine B. In connection with the transmission of power from the driven gears 25 to the wheels 4, there is provided a very compact bearing and flexible-joint arrangement which includes the following:

Annular internal roller bearing races 30 (see Figs. 4 and 5) are mounted on the axle extension 10. Roller bearings 31, retained by the small shoulders shown on races 30, co-operate with said internal races and a pair of external races 32, the latter being fitted inside a bearing or mounting ring 33 which is rockingly mounted in the aperture formed in the sleeve or collar 11 of rocking beam 12 so as to provide, in a relatively light and small construction a very flexible angling means between the axle 3 and the beam 12. The two races 32 have inwardly convergingly inclined faces, as shown, and are spaced apart by the internal rib 34 of the sleeve or ring 33. The races 30, having similar inclined faces, are retained as against spreading apart, by the collar 35 threaded onto sleeve 36 which may abut the wheel 4, or, as shown, a shoulder on the axle, and by the hub of the flexible driving or coupling element 37, which latter is fixed onto the reduced portion 38 of axle extension 10, as by a key 39 and castellated nut 40 (see Fig. 5). A retaining screw 33a may be provided for mounting 33. It will be understood, of course, that the roller bearing devices, per se, are not my invention, but that other forms of bearings may be used.

Figures 3, 4:
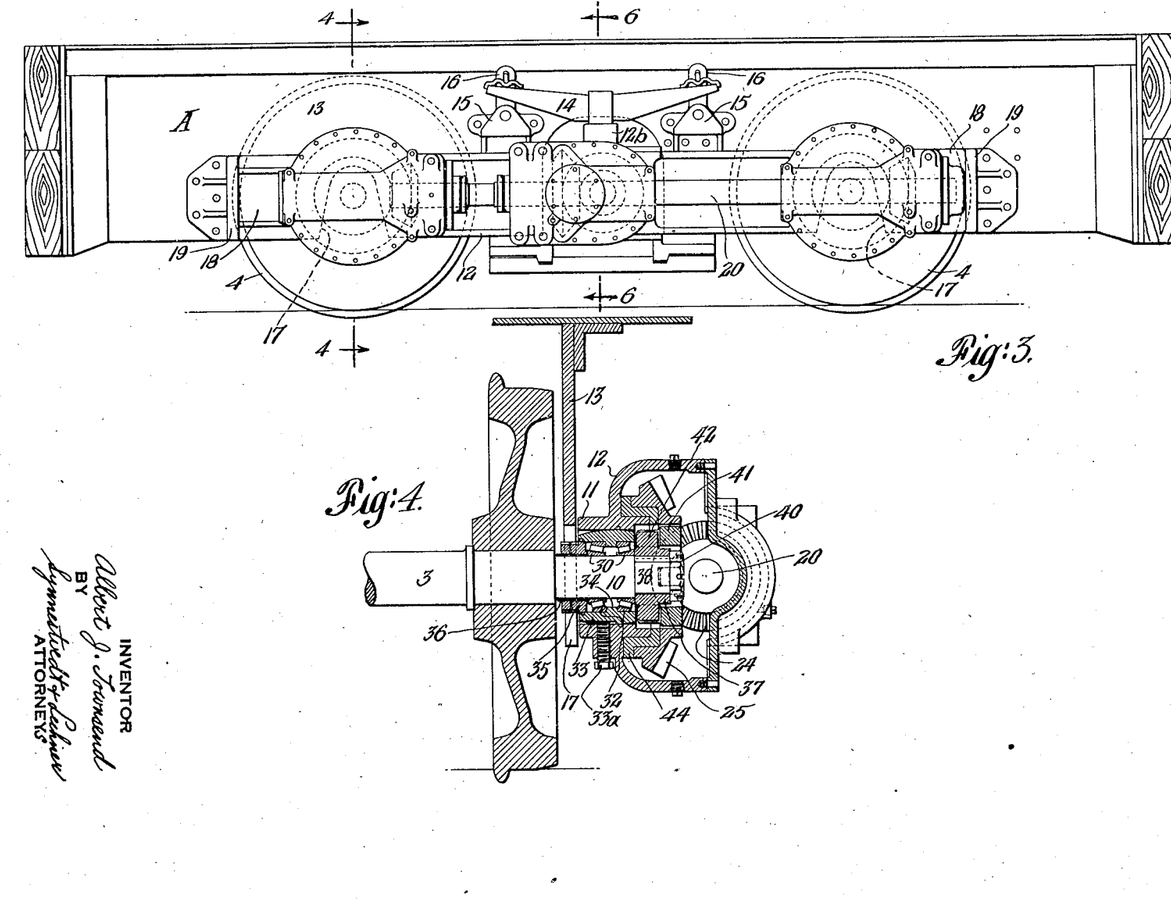
Figure 3 is a view similar to Fig. 1, on an enlarged scale, of the frame, running gear and driving mechanism shown in Fig. 1.
Figure 4 is a section of a portion of the running gear and driving mechanism, taken on line 4—4 of Fig. 3.
Figure 5:
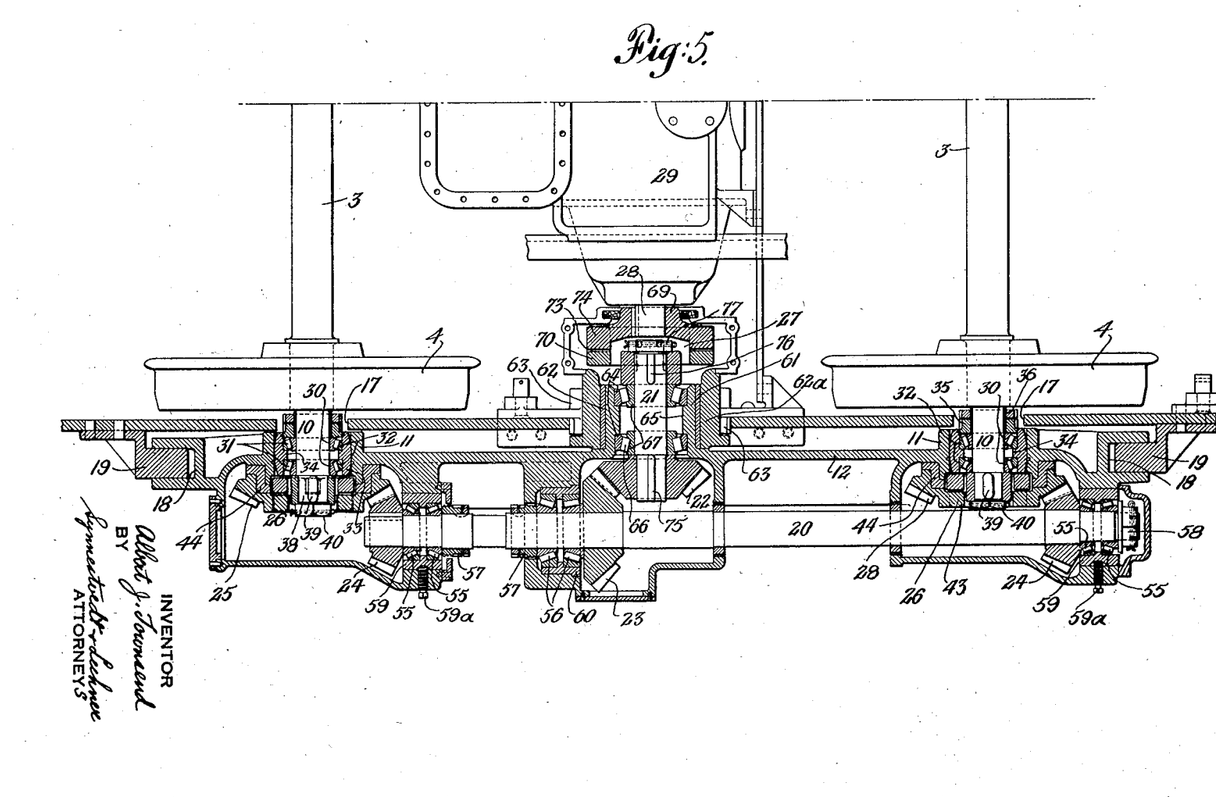
Figure 5 is a half plan view of the structure shown in Fig. 3, with the upper part of the frame omitted and with the driving mechanism shown in section.

The member 37 of the coupling being thus mounted on the axle itself, at the outside end thereof, not only serves as a very secure and compact retaining member for the bearing races and mounting ring, but is also thereby very conveniently and readily arranged and positioned for connection with the other parts of the flexible coupling (before referred to in general by the numeral 26). Said coupling includes a ring member 41 which is apertured at its inner side face (at two diametrically opposed points, as seen in Fig. 4) to receive the two lugs 42 of member 37, and is similarly apertured at two points on its opposite or outer side face (such points being circumferentially removed 90° from those first-mentioned, as seen in Fig. 5) to receive the two lugs 43, internally extending from the ring gear 25. Said gear is, in turn, mounted for free rotation (when driven by gear 24) around the ring-like rib or sleeve 11 by means of the bearing ring 44. The mounting, positioning, and retention of the axle bearing, ring gear and flexible coupling, while neat and compact so as to fit in the limited space available and to cut down unsprung weight, will also be seen to be such as to provide full flexibility or movement for relative rotation and angling of the parts as is demanded in a locomotive driving and three-point supporting construction operating after the manner of the disclosure of this application.

Figure 1:
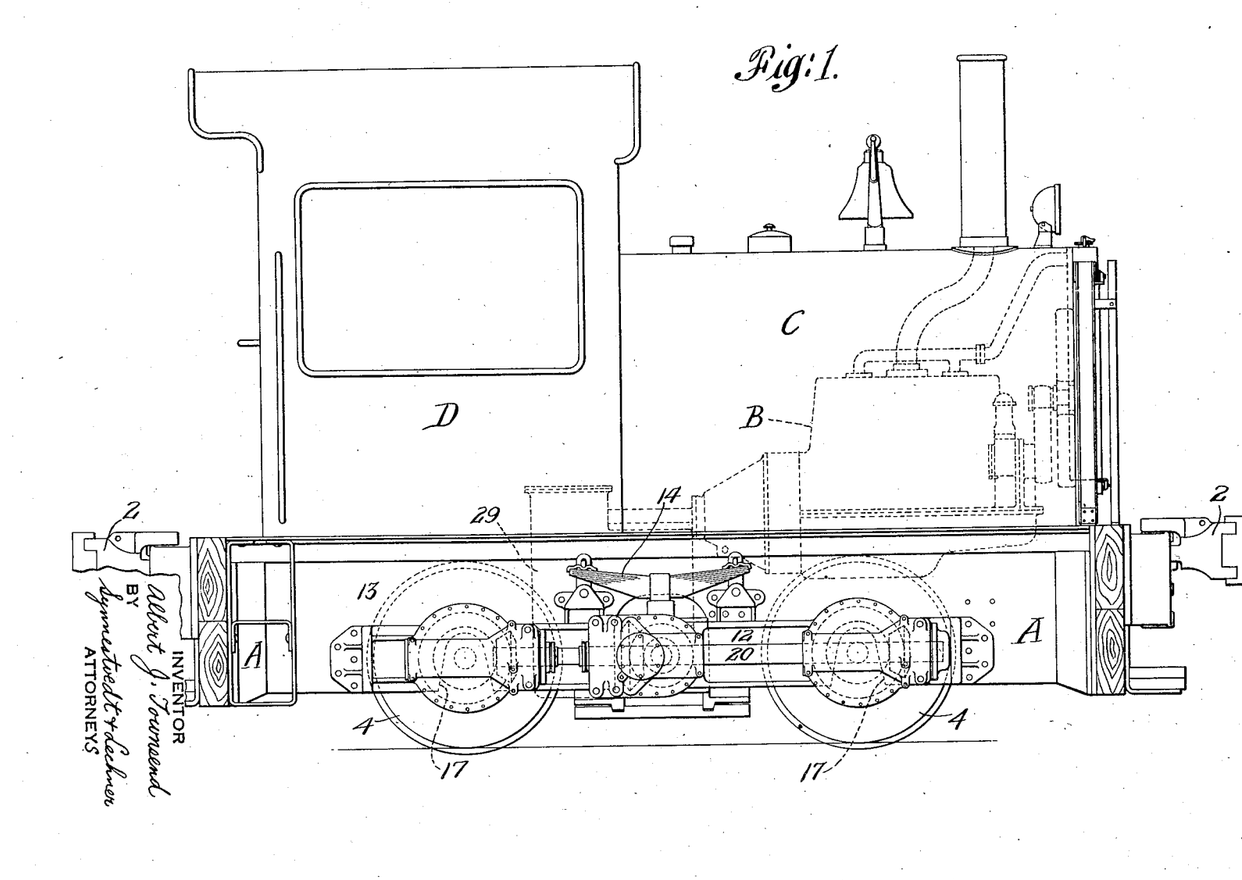
Figure 1 is a right side elevational view of a locomotive embodying my improvements.
Figure 2:
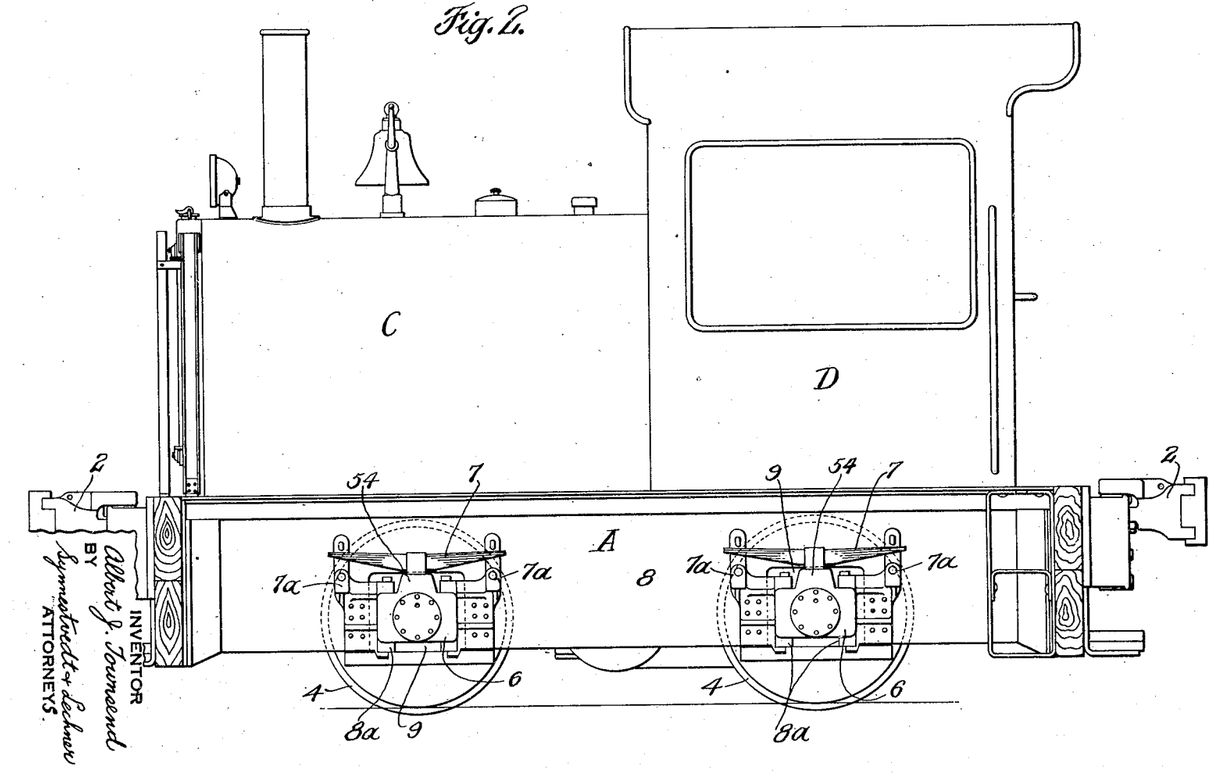
Figure 2 is a similar left side elevational view.
Figure 6:
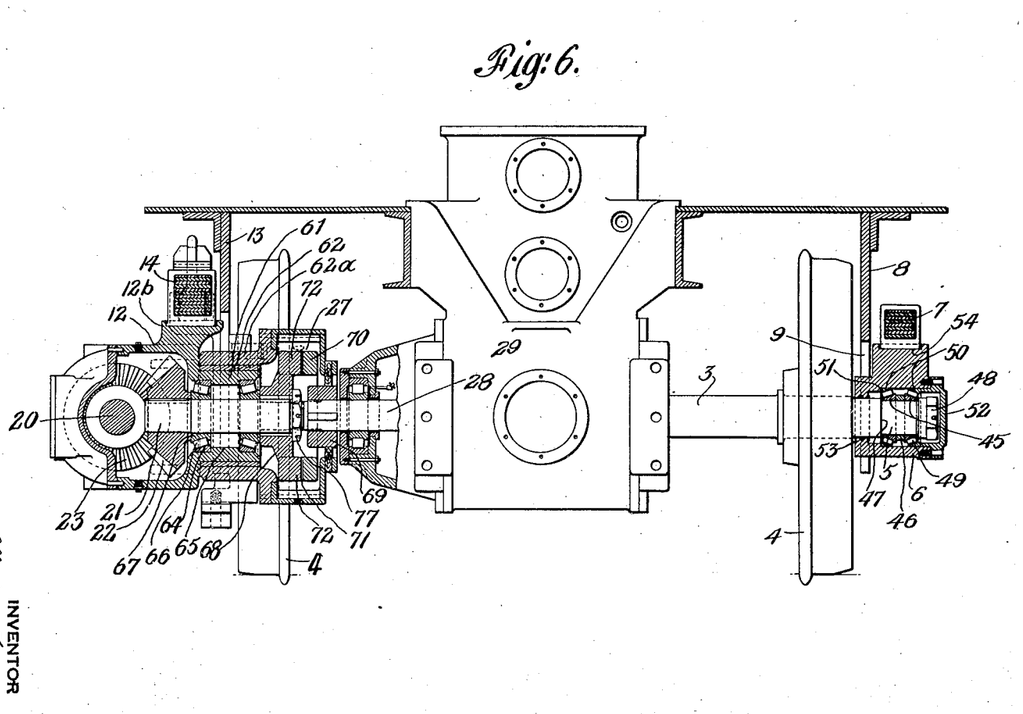
Figure 6 is an irregular transverse sectional view through the structure of Figure 3, with certain parts shown in elevation, the sectional portion at the left of Fig. 6 being taken on line 6—6 of Fig. 3, and the sectional portion at the right of Fig. 6 being taken at the rear axle of Fig. 3.

The bearing and other arrangements for the opposite (left) end of each axle, as seen in Figs. 2 and 6 (in the latter of which the rear axle is shown) are also very simple and compact. The axle extension 5 is provided with a pair of inner races 45, spaced and positioned by a ring 46, axle shoulder 47, and retaining nut 48. The bearing rollers 49 are retained by the small shoulders on inner races 45 and bear on said races and the outer races 50, the latter being retained by internal shoulder 51 of the axle-box 6 and the inwardly extending flange of axle-box cover 52. Said cover, and the flange 53 which seals around the axle serve to complete the enclosure of the box, for retaining lubricant and excluding foreign matter. Seat 54 on top of the box serves as a convenient mounting for the spring 7.

Reverting to the driving mechanism, as best seen in Fig. 5, it will be seen that I have provided bearing arrangements somewhat similar to those for the axles, roller bearings 55 and 56 on line-shaft 20 being mounted in similar inclined races and retained by gears 23, 24, 24, collars 57, 57, and nut 58. Suitable mounting rings 59, 59 and 60, each with an internal spacing ring or rib for the outer bearing races, are provided, as well as a retaining screw 59a for each ring 59.

For the jack-shaft 21 (see Figs. 5 and 6) I have provided a bearing and flexible driving-joint arrangement very similar to that on axle extensions 10, but reversed in relation, to wit: the bearing is placed toward the outside and the flexible joint toward the inside. To this end, the fulcrum 61 of rocking beam 12 (which is rotatively mounted in a brass bearing member 62 contained within a fulcrum block 62a slidable vertically in guides 63), is internally provided with a pair of races 64, spaced by rib or shoulder 65. The rollers 66 ride between these races and the inner races 67 which, as before, I have provided with retaining shoulders. The hub of joint member 68 and the hub of pinion 22 serve to retain the inner bearing races 67.

The flexible driving joint comprises, in addition to member 68, a member 69 on shaft 28, and a driving ring 70 which has recesses 71, 71 on one face to receive lugs 72, 72 of member 68, and recesses 73, 73 on the other (inner face) to receive lugs 74, 74 of member 69. Suitable keys 75, 76 are provided for gear 22 and member 69, as well as a securing nut 77 for the latter.

From the foregoing description it will be evident that the desired objects are attained by a construction which, while providing for the necessary flexibility, stable three-point support, and angling of shafts, axles, etc., is yet very compact, simple and rugged. Furthermore, although it is conveniently possible to utilize roller bearings or any other form of bearing throughout, I have so arranged the bearings and flexible joint parts, with relation to the shafts, axles and gears of the driving mechanism that many parts are assembled and disassemblable in series, whereby one part retains the next in place, and so on.

In general, it will be seen that I have devised a locomotive construction suitable for rough usage on rough and uneven track which provides perfect three-point suspension with minimum complication of spring and equalizer mechanism, good tracking and riding even though the wheelbase is very short, a rugged and compact driving arrangement for carrying the power from the centrally located unit power plant to the outer ends of the axles, and a means for carrying, housing and shielding the driving mechanism, which, although maintaining proper alignment and meshing of the driving elements under all conditions of service and of wear of the parts, permits free angling and shifting of the parts relative to each other and to the main frame, free movement and flexure of the springs, and proper equalization or distribution of the weight.

I claim:—

1. In a vehicle, a plurality of axles with their wheels, and three springs transmitting the weight of the superstructure to said axles, two being on one side of the vehicle and one on the other.

2. In a vehicle, a three point spring suspension system, the springs of which are connected with the vehicle frame without intermediate equalizers, two points of which are on one side of the longitudinal center line, and the third point of which is on the other side of said line.

3. In a vehicle, a three point spring suspension system, the springs of which are connected with the vehicle frame without intermediate equalizers, two points of which are on one side of the longitudinal center line, and the third point of which is on the other side of said line, said latter point considered longitudinally of the vehicle being intermediate the other two points.

4. In a vehicle, a plurality of axles, and a three point supporting system interposed between said axles and the vehicle body, two points of which bear on separate axles, and the third of which bears on a plurality of axles.

5. In a vehicle, a pair of axles, an equalizer device, and a three point supporting system interposed between said axles and the vehicle body, one point of which is connected to the body only in a zone between the said axles and bears on both axles of said pair through said equalizer device.

6. In a vehicle, a plurality of axles, an equalizer device, and a three point supporting system interposed between said axles and the vehicle body, one point of which bears on a plurality of axles through the intermediation of said equalizer device, together with driving means for the axles mounted to move with said equalizer device.

7. In a vehicle, a plurality of axles, an equalizer device, and a three point supporting system interposed between said axles and the vehicle body, one point of which bears on a plurality of axles through the intermediation of said equalizer device, together with driving means for the axles mounted to move with said equalizer device, said equalizer device being rockingly associated with said axles.

8. In a vehicle, a plurality of axles, an equalizer device, and a three point supporting system interposed between said axles and the vehicle body, one point of which bears on a plurality of axles through the intermediation of said equalizer device, together with driving means for the axles mounted to move with said equalizer device, said equalizer device being rockingly associated with said axles, and said driving means having flexible connection to said axles.

9. In a vehicle, a three-point suspension system, two points of which are on one side of the longitudinal center line, and the third point of which is on the other side of said line, together with driving mechanism for the vehicle axles connected thereto on the latter side.

10. In a vehicle with its axles and wheels, spring units individually transmitting weight each to one of a pair of axles, respectively, at one side of the vehicle, and a spring unit commonly transmitting weight to both axles of said pair at the other side of said vehicle and being positioned between said two axles.

11. In a vehicle with its axles and wheels, spring units individually transmitting weight each to one of a pair of axles, respectively, at one side of the vehicle, and a spring unit commonly transmitting weight to both axles of said pair at the other side of said vehicle and being positioned between said two axles, together with an equalizing member through which said latter spring transmits such weight.

12. In a vehicle with its axles and wheels, spring units individually transmitting weight each to one of a pair of axles, respectively, at one side of the vehicle, and a spring unit commonly transmitting weight to both axles of said pair at the other side of said vehicle, together with an equalizing member through which said latter spring transmits such weight and a driving means for the axles arranged to permit relative movement between axles.

13. In a vehicle with its axles and wheels, spring units individually transmitting weight each to one of a pair of axles, respectively, at one side of the vehicle, and a spring unit commonly transmitting weight to both axles of said pair at the other side of said vehicle, together with an equalizing member through which said latter spring transmits such weight and a driving means for the axles arranged to permit relative movement between the axles and the vehicle.

14. In a locomotive, a pair of axles with their wheels, independent weight transmitting means from the frame of the locomotive to each axle on one side thereof, and interdependent weight transmitting means from the frame of the locomotive to said axles on the other side of the locomotive, together with transversely extending driving means positioned between said axles and longitudinally extending driving means coupled thereto and to said axles.

15. In a locomotive, a pair of axles with their wheels, independent weight transmitting means from the frame of the locomotive to each axle on one side thereof, and inter-dependent weight transmitting means from the frame of the locomotive to said axles on the other side of the locomotive, together with transversely extending driving means positioned between said axles and longitudinally extending driving means coupled thereto and to said axles, said interdependent weight transmitting means and said longitudinal driving means being movable with respect to said transverse driving means, and said two driving means being flexibly interconnected.

16. In a railway vehicle having a frame, and running gear including axles and wheels, driving mechanism for the running gear including a power shaft extending transverse the vehicle between axles thereof, a line shaft extending from axle to axle, constantly-aligned driving gears connected to the line shaft and having an Oldham coupling to the power shaft, and sets of constantly aligned gears connected to the line shaft each set of which has a universal connection to an element of the running gear of the vehicle.

17. In railway vehicle driving connections including a power source, a plurality of transverse axles, a transverse driving shaft and a longitudinal shaft for driving an axle from said transverse shaft, the combination of a non-angling flexible connection between the power source and the driving shaft, and an angling flexible connection between the longitudinal shaft and the axle.

18. In railway vehicle driving connections including a power source, a plurality of transverse axles, a transverse power shaft connected to the power source, a transverse driving shaft and a longitudinal shaft for driving an axle from said transverse driving shaft, the combination of a flexible connection between the power shaft and the driving shaft, means for maintaining said shafts in parallelism and a flexible connection between the longitudinal shaft and an axle.

19. In railway vehicle driving connections including a power source, a plurality of transverse axles, a transverse driving shaft and a longitudinal shaft for driving an axle from said transverse shaft, the combination of a flexible connection between the power source and the transverse driving shaft, and an angling flexible connection between the longitudinal shaft and an axle, together with a rockingly-mounted bearing for said driven axle.

20. In a railway vehicle with its frame, axles, and wheels, a floating box member between axles, a line-shaft supported thereby, a driving shaft extending transversely of the vehicle, a flexible driving connection between the shafts, and flexible driving connections between the line-shaft and the axles.

21. In a railway vehicle with its frame, axles, and wheels, a floating lever box member between axles, a line-shaft supported thereby, a driving shaft extending transversely of the vehicle, a flexible driving connection between the shafts, and flexible driving connections between the line-shaft and the axles, together with a spring transmitting weight from the frame to a point on said box member intermediate its ends.

22. In a locomotive, a pair of axles, and a three-point supporting system for the body of the locomotive, which includes said pair of axles and three bearing boxes one of which is common to both axles.

23. In a locomotive, a pair of axles, and a three-point supporting system for the body of the locomotive, which includes said pair of axles and three bearing boxes one of which is common to both axles, together with a three-unit spring system.

24. In a locomotive, a pair of axles, a three-point supporting system for the body of the locomotive, which includes said pair of axles and three bearing boxes one of which is common to both axles, together with a three-unit spring system, each of the three units, respectively, transmitting weight to one of the boxes.

25. In a locomotive, a pair of axles, a three-point supporting system for the body of the locomotive, which includes said pair of axles and three bearing boxes one of which is common to both axles, together with a three-unit spring system, each of the three units, respectively, transmitting weight to one of the boxes, and said common box receiving such weight intermediate the said pair of axles.

26. In a locomotive, a pair of axles, and a three-point supporting system for the body of the locomotive which includes said pair of axles and three bearing boxes one of which is common to both axles, said axles being rockingly journalled in said common box.

27. In a vehicle, a frame with a plurality of axles and their wheels mounted therein, and three spring units transmitting all the weight from said frame to said axles, two being on one side of the frame and one on the other.

28. In a locomotive, a pair of axles, and a three-point supporting system for the body of the locomotive, which includes said pair of axles and three bearing boxes one of which is common to both axles together with a driving system for at least one of said axles.

29. In a locomotive, a pair of axles, and a three-point supporting system for the body of the locomotive, which includes said pair of axles and three bearing boxes one of which is common to both axles together with a driving system for at least one of said axles having flexible connection means to accommodate axle and box movements.

30. In a locomotive, a pair of axles, and a three-point supporting system for the body of the locomotive, which includes said pair of axles and three bearing boxes one of which is common to both axles together with a driving system for at least one of said axles extending from a point inside the plane of the wheels to a point outside thereof.

31. In a locomotive, a pair of axles, and a three-point supporting system for the body of the locomotive, which includes said pair of axles and three bearing boxes one of which is common to both axles together with a driving system for at least one of said axles supported at least in part by said common box.

32. In a locomotive, a pair of axles, and a three-point supporting system for the body of the locomotive, which includes said pair of axles and three bearing boxes one of which is common to both axles together with a driving system for at least one of said axles extending from a point inside the plane of the wheels to a point outside thereof, at least the driving mechanism outside said plane being supported by said common box.

33. In a locomotive, a pair of axles, and a three-point supporting system for the body of the locomotive, which includes said pair of axles and three bearing boxes one of which is common to both axles together with a driving system for at least one of said axles carried laterally outward from a source of power and thence longitudinally to the said axle.

34. In a locomotive, a pair of axles, and a three-point supporting system for the body of the locomotive, which includes said pair of axles and three bearing boxes one of which is common to both axles together with a driving system for at least one of said axles carried laterally outward from a source of power and thence longitudinally along said common box to the said axle.

35. In a locomotive, a pair of axles, and a three-point supporting system for the body of the locomotive, which includes said pair of axles and three bearing boxes one of which is common to both axles together with a driving system for at least one of said axles carried laterally outward from a source of power and thence longitudinally along said common box to the said axle, said driving mechanism having bearings on said common box.

36. In a railway vehicle with its axles and wheels, a combined floating equalizer and common box member for a plurality of axles.

37. In a railway vehicle with its frame, axles, and wheels, an axle-box member common to a plurality of axles and floating with respect to said frame.

38. In a railway vehicle with its frame, axles, and wheels, an axle-box member common to a plurality of axles and positioned as an equalizer between them and movably positioned by said frame to transmit weight from said frame to said axles.

39. In a railway vehicle with its frame, axles, and wheels, an axle-box member common to a plurality of axles and positioned as an equalizer between them, together with a three-point suspension for said frame.

40. In a railway vehicle with its frame, axles, and wheels, an axle-box member common to a plurality of axles and positioned as an equalizer between them, together with a three-point suspension for said frame at least one point of which is on said box member.

41. In a railway vehicle with a frame structure and its axles and wheels, a combined equalizer and common axle box structure for a plurality of axles, having longitudinally spaced-apart drive-shaft supports and means providing for vertical movement but lateral fixation with respect to said frame structure.

42. In a railway vehicle with a frame structure and its axles and wheels, a combined equalizer and common axle box structure for a plurality of axles, having longitudinally spaced-apart drive-shaft bearing supports and means providing for vertical movement but lateral fixation with respect to said frame structure.

43. In a railway vehicle with a frame structure and its axles and wheels, a combined equalizer and common axle box structure for a plurality of axles, having housing means for driving mechanism and means providing for vertical movement but lateral fixation with respect to said frame structure.

44. In a railway vehicle with a frame structure and its axles and wheels, a combined equalizer and common axle box structure for a plurality of axles, having supporting means for driving mechanism and means providing for vertical movement but lateral fixation with respect to said frame structure.

45. In a railway vehicle with its axles and wheels, a frame having means for transmitting weight to said axles, said means at least on one side of the frame comprising a combined equalizer and common box structure, for a plurality of axles, floating with respect to said frame.

46. In a railway vehicle, a common box member for a plurality of axles and yieldable means transmitting weight to said member, the member being mounted to have capacity for slidable and rocking movement with respect to said vehicle in a vertical plane only.

47. In a railway vehicle, a common box member for a plurality of axles and yieldable means transmitting weight to said member, the member being slidably and rockingly movable with respect to the vehicle and rockingly mounted with respect to said means.

48. In apparatus of the character described, a common floating box member, for a plurality of axles, having longitudinally spaced-apart axle-receiving apertures.

49. In apparatus of the character described, a common floating box member, for a plurality of axles, having longitudinally spaced-apart journal-bearing supports.

50. In apparatus of the character described, a common floating box member, for a plurality of axles, having supporting means for driving mechanism.

51. In a vehicle, a floating box member journalling two axles, driving mechanism for said axles, carried on said member, a power device on the vehicle, and a flexible connection between said device and said mechanism.

52. In a vehicle, a rocking box member journalling two axles, driving mechanism for said axles, carried on said member, a power device on the vehicle, and a flexible connection between said device and said mechanism, said flexible connection being adjacent the normal point of rocking of said box member.

53. In a vehicle, a floating box member journalling two axles, driving mechanism for said axles carried on said member, a power device on the vehicle, and a flexible connection between said device and said mechanism, said mechanism including interconnected transverse and longitudinal shafts, the latter of which is flexibly connected to said axles.

54. In a vehicle, a floating box member journalling two axles, driving mechanism for said axles, carried on said member, a power device on the vehicle, and a flexible connection between said device and said mechanism, said mechanism including interconnected transverse and longitudinal shafts, the latter of which is flexibly connected to said axles, said transverse shaft being adjacent the normal point of rocking of said box member.

55. In a vehicle, a source of power, a plurality of axles, a common box member journalling a pair of axles, a line shaft journalled on the box, a transverse shaft mounted on the box delivering power from said source to said line shaft, bevel gearing between the shafts, bevel gearing at the ends of the line shaft, flexible connections between the latter gearing and said pair of axles and a flexible connection between the power source and the transverse shaft.

56. In apparatus of the character described, a common movable box member for a plurality of axles, means adjacent the ends thereof for positioning the same laterally, and means intermediate its ends for positioning it longitudinally.

57. In apparatus of the character described, a common movable box member for a plurality of axles, means adjacent the ends thereof for positioning the same laterally, and means intermediate its ends for positioning it longitudinally, said latter means including a trunnion means arranged to permit rocking movement of said member in a vertical plane.

58. In apparatus of the character described, a common movable box member for a plurality of axles, means adjacent the ends thereof for positioning the same laterally, and means intermediate its ends for positioning it longitudinally, said latter means including a trunnion means arranged to permit sliding and rocking movement of said member in a vertical plane.

59. In apparatus of the character described, a common movable box member for a plurality of axles, means adjacent the ends thereof for positioning the same laterally, and means intermediate its ends for positioning it longitudinally together with means transmitting weight thereto adjacent said intermediate point.

60. In apparatus of the character described, a common movable box member for a plurality of axles, means adjacent the ends thereof for positioning the same laterally, and means intermediate its ends for positioning it longitudinally, said latter means including a trunnion means arranged to permit rocking movement of said member in a vertical plane, together with vertical guide means in which said trunnion means is mounted.

61. In apparatus of the character described, a common box member, for a plurality of axles, having guide means adapted to engage co-operating guide means on the vehicle.

62. In a railway vehicle with its frame, axles and wheels, a floating-lever box-member between axles, a drive-shaft supported thereby, and flexible driving connections between the drive-shaft and the axles.

63. In a railway vehicle with its frame, axles, and wheels, an axle-box member common to a plurality of axles and vertically floating with respect to said frame.

64. In a railway vehicle with its axles and wheels, a supporting system including rigidly united axle box means for a plurality of axles, and individual axle box means for each of said axles at the opposite end thereof, together with a three-point spring suspension system bearing upon said axle box means.

65. In a vehicle with its axles and wheels, a pair of resilient mechanisms at one side of the vehicle, each transmitting weight, respectively, from the vehicle body to one axle of a pair, and a third resilient mechanism at the opposite side of the vehicle positioned between said pair of axles and transmitting weight from the body of the vehicle to both said axles.

66. For a railway vehicle having a power plant mounted therein and a plurality of driven axles mounted therein with freedom for relative vertical and rocking movement with respect thereto, a driving system for said axles including a driving shaft mounted for rotation and for vertical displacement with respect to the vehicle and means restraining said shaft as against other displacement movements, means of flexibility in said system to accommodate the relative vertical displacement movements between said shaft and the vehicle, and other means of flexibility in said system to accommodate the relative rocking movement of said axles.

67. In a railway vehicle, a weight-carrying frame-structure, a pair of axles, three box structures movably associated with said frame-structure, one of said boxes being arranged to transmit weight from said frame-structure to one of said axles, another from said frame-structure to the other of said axles, and both axles being rockingly journaled in the third box which is arranged to transmit weight from said frame-structure to both said axles, the movable association of said boxes with said frame-structure being such that the three box structures constitute a three-point support interposed between the two axles and the said frame structure.

68. In a railway vehicle, a weight-carrying frame-structure, a pair of axles, three box structures movably associated with said frame-structure, one of said boxes being arranged to transmit weight from said frame-structure to one of said axles, another from said frame-structure to the other of said axles, and both axles being rockingly journaled in the third box which is arranged to transmit weight from said frame-structure to both said axles, the movable association of said boxes with said frame-structure being such that the three box structures constitute a three-point support interposed between the two axles and the said frame-structure, driving mechanism for at least one of said axles, means for mounting said mechanism on said common box, and a flexible drive connection between said driving mechanism and at least one of said axles.

69. In railway vehicle supporting and driving mechanism of the character described, a frame-supporting and axle-driving assembly comprising: a longitudinally extending equalizer structure having a laterally extending hollow trunnion intermediate its ends; a rockable axle journal mounting means adjacent each end of said structure and through which weight is transmitted from said structure to a pair of axles; vertically slidable means for journaling said trunnion in the aforementioned frame; means on said structure for mounting a weight transmitting spring device adjacent said trunnion; vertically sliding guide-means spaced-apart longitudinally of said structure and positioned to fix said structure laterally with respect to the aforementioned frame; transverse drive-shafting journaled in said hollow trunnion; a flexible joint for coupling said shafting to a source of power on the vehicle and constructed to accommodate relative vertical movements between said structure and said source of power; means for transmitting power from said shafting longitudinally along said structure to at least one of the aforementioned axles, said means being mounted on said structure to move therewith; and means for flexibly coupling the last mentioned means to said axle and constructed to accommodate relative rocking movements between said structure and said axle.

ALBERT J. TOWNSEND.